United States Patent [19]

Magocs

[11] Patent Number: 5,387,948
[45] Date of Patent: Feb. 7, 1995

[54] METHOD AND APPARATUS FOR REDUCING SCATTERED LIGHT IN PROJECTION TELEVISION TUBES

[75] Inventor: Stephen Magocs, Knoxville, Tenn.

[73] Assignee: North American Philips Corporation, New York, N.Y.

[21] Appl. No.: 56,645

[22] Filed: May 3, 1993

[51] Int. Cl.⁶ .................. H04N 9/31; H04N 5/74
[52] U.S. Cl. .................. 348/779; 348/834; 348/746; 348/786
[58] Field of Search .......... 358/60, 64, 237, 252, 358/255, 231, 242, 250, 245; H04N 5/74, 9/16, 9/31; 313/474, 478; 348/779, 778, 776, 781, 786, 744, 745, 746, 805, 806, 807, 808, 818, 819, 832, 834, 835, 842, 841

[56] References Cited

U.S. PATENT DOCUMENTS

| | | | |
|---|---|---|---|
| 4,388,642 | 6/1983 | Reno, Jr. et al. | 358/60 |
| 4,393,329 | 7/1983 | Lehnert | 313/474 X |
| 4,432,011 | 2/1984 | Lehnert | 358/60 |
| 4,591,757 | 5/1986 | Bakker et al. | 358/255 |
| 4,675,571 | 6/1987 | Bakker et al. | 313/461 |
| 4,737,678 | 4/1988 | Hasegawa | 358/250 X |
| 4,405,949 | 9/1983 | Hockenbrock et al. | 358/237 |

FOREIGN PATENT DOCUMENTS

| | | | |
|---|---|---|---|
| 0175520 | 9/1985 | European Pat. Off. | H01J 29/34 |
| 0395821 | 11/1989 | European Pat. Off. | H01J 29/28 |
| 54-115023 | 9/1979 | Japan | 358/64 |
| 54-117632 | 9/1979 | Japan | 358/255 |
| 54-118730 | 9/1979 | Japan | 358/255 |
| 61-126740 | 6/1986 | Japan | H01J 29/07 |
| 61-281443 | 12/1986 | Japan | 313/478 |
| 62-122463 | 6/1987 | Japan | H04N 3/223 |

*Primary Examiner*—James J. Groody
*Assistant Examiner*—Safet Metjahic
*Attorney, Agent, or Firm*—Anne E. Barschall

[57] ABSTRACT

To prevent light scattering at the edges of CRT's used in projection television, emission of light is prevented beyond a desired region of raster scanning. In one embodiment, portions of the front surfaces of the CRT's outside the desired region are darkened to prevent light emission.

13 Claims, 8 Drawing Sheets

METHOD AND APPARATUS FOR REDUCING SCATTERED LIGHT IN PROJECTION TELEVISION TUBES

I. BACKGROUND OF THE INVENTION

A. Field of the Invention

The present application relates to the field of projection television and in particular to CRT's (cathode ray tubes) used in such televisions.

B. Related Art

A projection television according to the prior art is shown in FIG. 1a. Three CRT's 101, 102, and 103 are used to produce red, green, and blue, respectively. Each CRT includes a lens assembly, where a lens is sealed to the front surface of the CRT, with fluid filling the space between the front surface and the lens. Light from the CRT's is reflected off a mirror 104 near the top of the set to produce an image on a screen 105. The green CRT 102 has an axis 106, which folds at the mirror 104, so that light on the axis 106 is incident perpendicular to the screen 105. The red and blue CRT's 101 and 103 have axes 107 and 108 which point toward the axis 106 of the green CRT.

FIG. 1b is an unfolded view of the television set of FIG. 1a.

The front surface of each CRT includes a portion around the edges which is not usable to project an image. Typically in a 7" CRT, for instance, a region having a diagonal in the range of 5" to 5.25" is usable. The raster of the CRT must therefore be restricted to the usable area. The raster approximately defines a rectangle on the green CRT and trapezoids on the blue and red CRT's. The trapezoids on the blue and red CRT's are approximately mirror images of each other. The trapezoids compensate for the angles of the axes of the CRT's. The trapezoids differ slightly in shape because of the different focal lengths of the lenses subjected to different color light and the resultant requirement for different angles of the CRT's.

The raster in each CRT, at the time the set is sold, scans an area which is slightly larger than the desired image projection area. This is necessary to increase the life of the set, because over time, as components age, the area scanned will shrink. In order to have a reasonably sized image during the expected life of the set, a slight overscan is required.

The result of the overscan is scattering of light at the edges of the CRT's and glare in the picture on the screen 105.

II. SUMMARY OF THE INVENTION

The object of the invention is to reduce this scattering and the resulting glare.

The object is achieved by preventing light from leaving the CRT beyond a certain boundary on the front surface of the CRT.

III. BRIEF DESCRIPTION OF THE DRAWING

The invention will now be described by way of non-limitative example with reference to the following drawings.

FIG. 7b shows a cross section of the O-ring of FIG. 7a.

FIG. 8b shows a cross section of the liquid seal of FIG. 8a.

FIG. 8c shows a second cross section of the liquid seal of FIG. 8a.

IV. DETAILED DESCRIPTION OF THE PREFERRED EMBODIMENTS

Figure 1A:
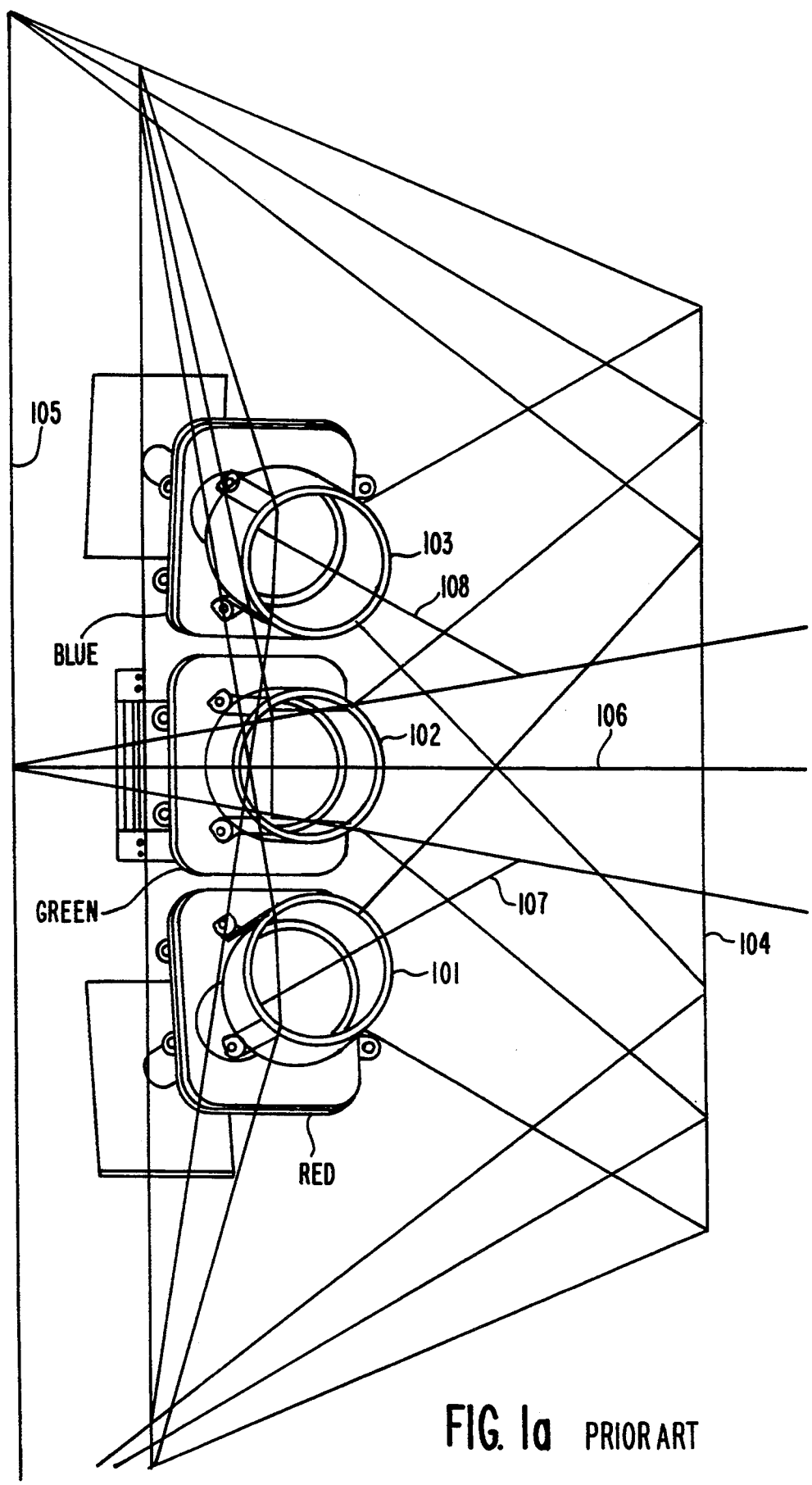
FIG. 1a is a perspective view of the inside of a prior art projection TV set.
Figure 2A:
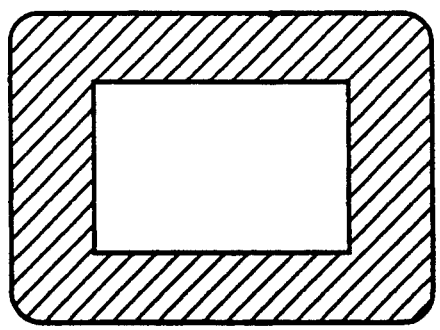
FIGS. 2a and 2b show the front surface of a CRT according to the invention.

FIG. 2a shows the front surface of a CRT with darkening around the edges of the area of desired raster scanning to prevent scattered light and resulting glare on the screen. The darkening has an inner boundary which defines a region which is approximately rectangular in shape. The shape shown in FIG. 2a is suitable to the green CRT of the projection television of FIG. 1a, where the light coming from the CRT is perpendicular to the screen.

Figure 2B:
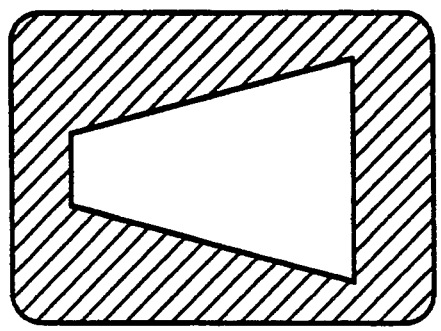

FIG. 2b shows the trapezoidal shape defined by the boundary of the darkened region of the red and blue CRT's. The trapezoids of the red and blue CRT's follow the shapes of the raster scanning on those CRT's.

Figure 2C:
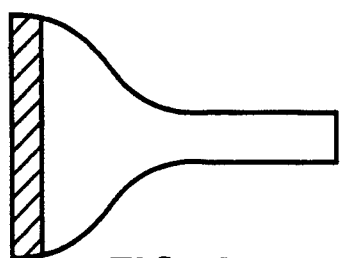
FIG. 2c shows a side view of a CRT according to the invention.

FIG. 2c shows a side view of the CRT's with the darkening according to the invention. The darkened band extends approximately half an inch up the skirt of the tube.

Those of ordinary skill in the art will appreciate that the darkening on the tube may be applied in a number of different ways. For instance, the darkening may be paint, applied to the inside of the tube during assembly. The same sort of black paint and painting technique which are commonly applied to the interpixel regions of direct view televisions can be used for such paint. Alternatively, some sort of masking may be applied to the outside of the tube. Simple masking tape applied to the exterior of the tube can work. In the CRT's of FIG. 1a, the o-rings sealing the lens assemblies to the CRT's may be shaped to create the darkenings shown in FIG. 2. Such a sealing could include a skirted or flanged o-ring forming the darkening, see FIGS. 7a–b, 8a–c, and 9. Alternatively, a rubber skirt may be attached to the outside of the tube covering the region to be darkened.

Figure 1B:
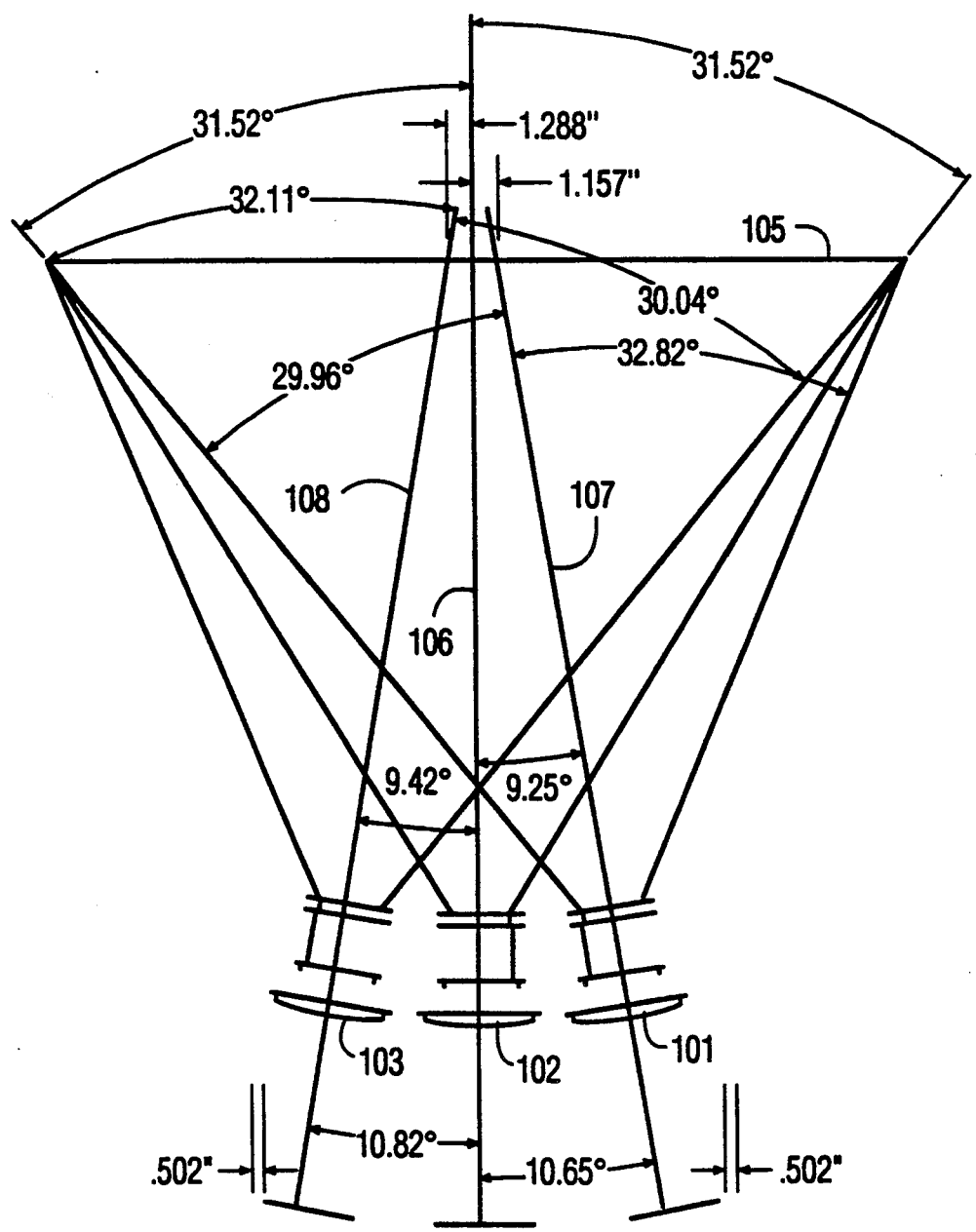
FIG. 1b is an unfolded view of the inside of the prior art projection TV set.
Figure 3:
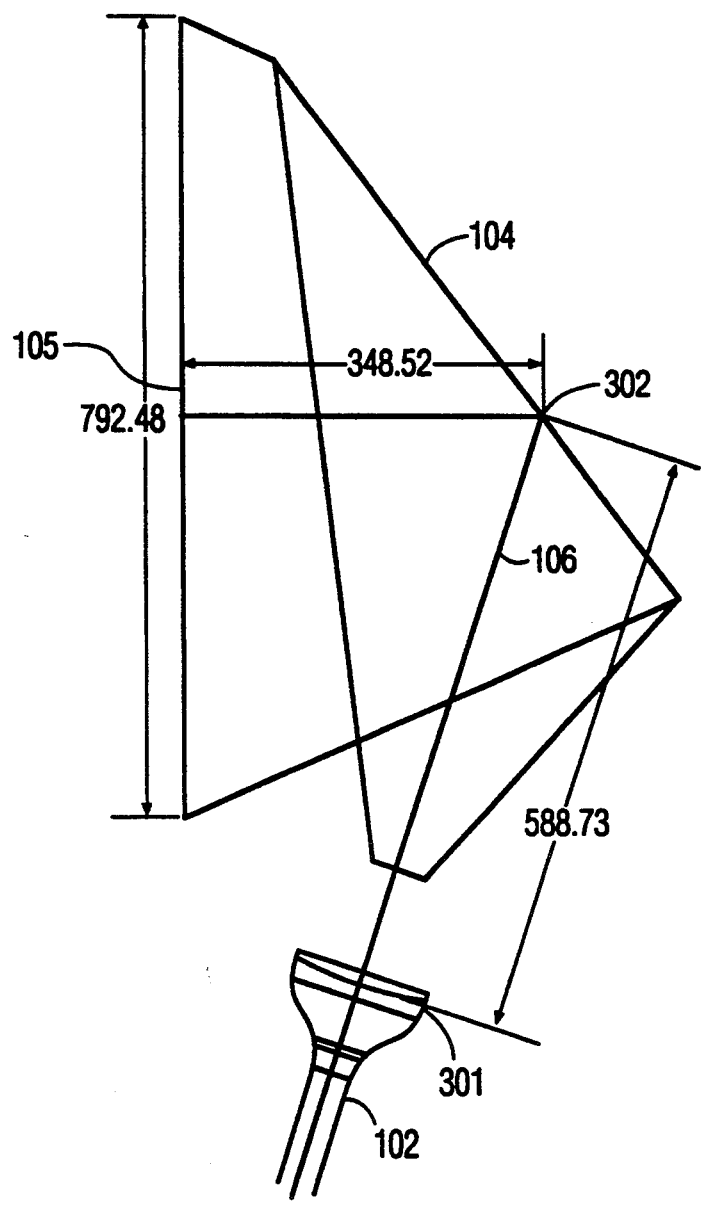
FIG. 3 shows a side view of measurements of dimensions within a projection television.

FIG. 3 shows a side view of the interior of the projection television of FIG. 1. In this view, it can be seen that the center of the front surface 301 of the green CRT 102 is 588.73 mm from the mirror 104. The distance from the point of intersection 302 of the axis 106 of the green CRT to the screen 105 is 348.52 mm. The height of the screen 105 is 792.48 mm.

Figure 4:
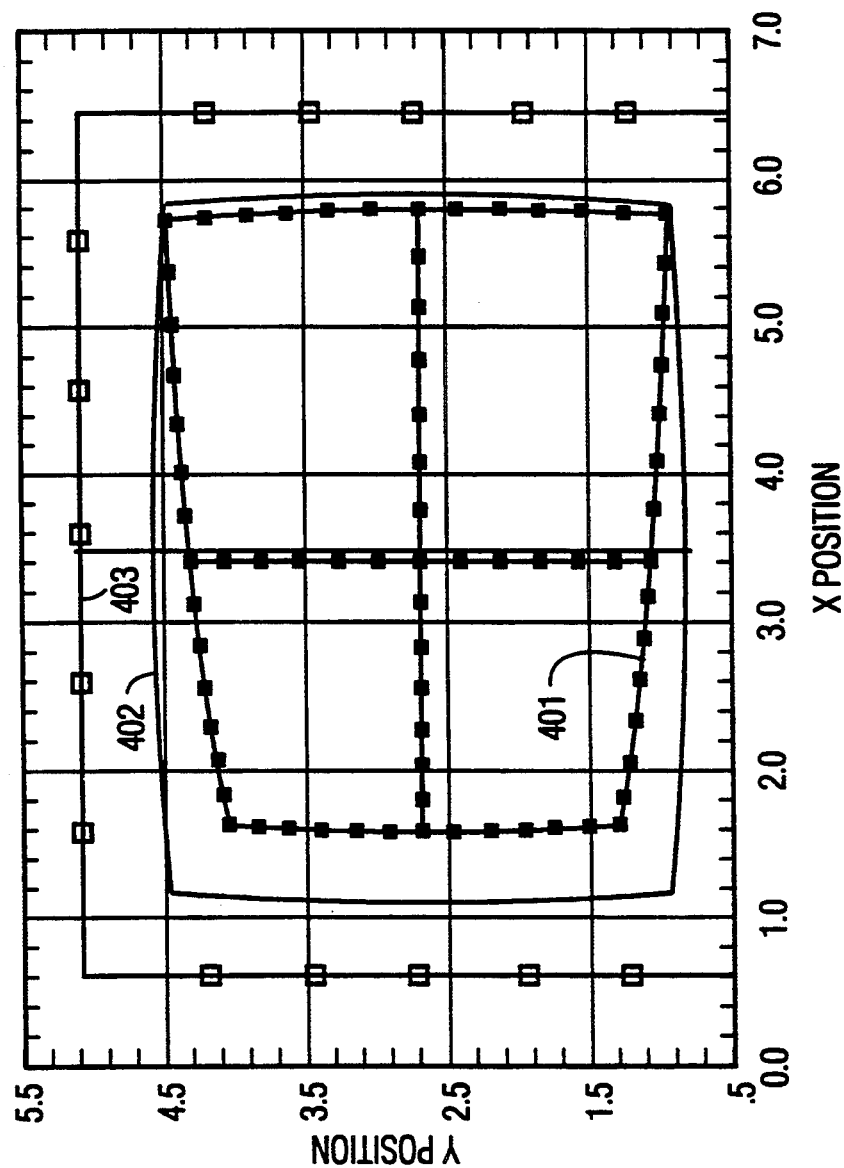
FIG. 4 shows dimensions on a front surface of the red CRT.
Figure 5:
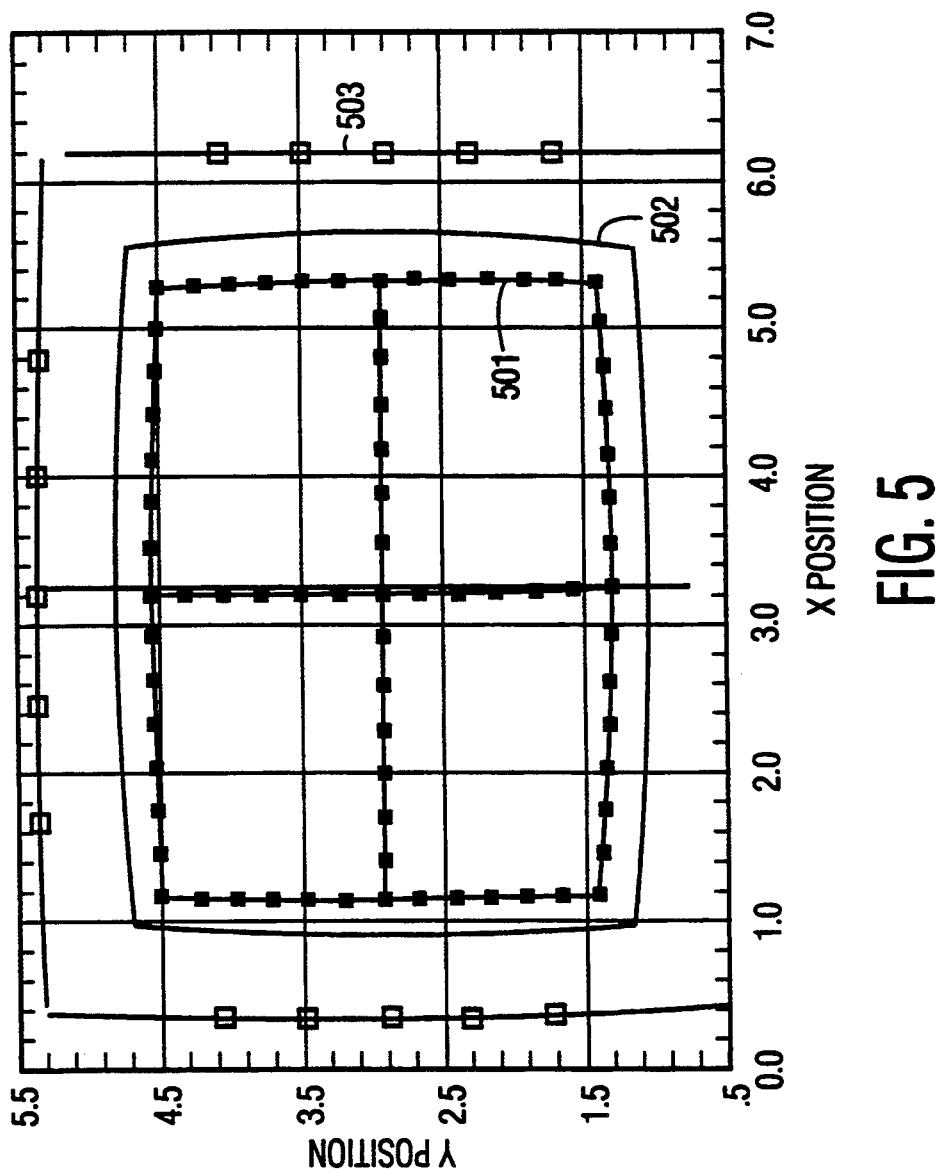
FIG. 5 shows dimensions on a front surface of the green CRT.
Figure 6:
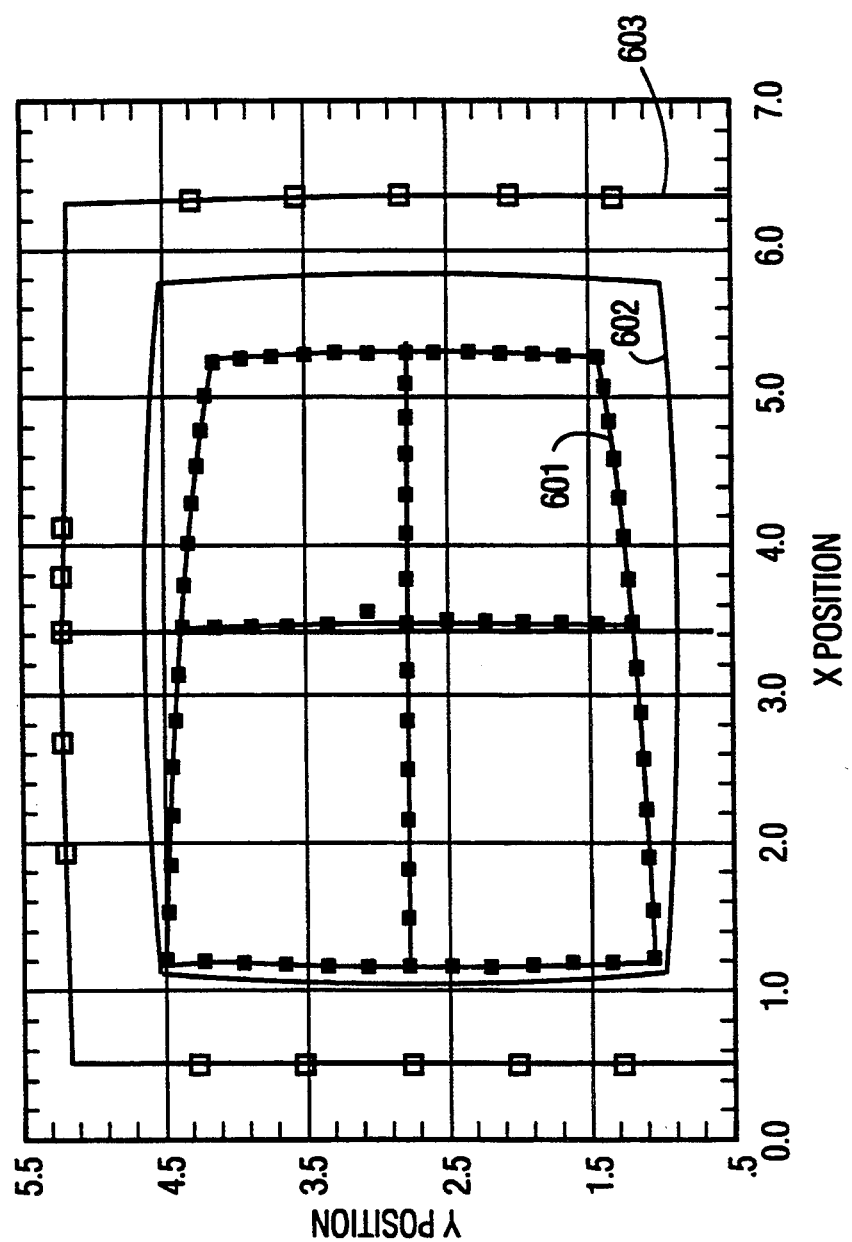
FIG. 6 shows dimensions on a front surface of the blue CRT.
Figure 7A:
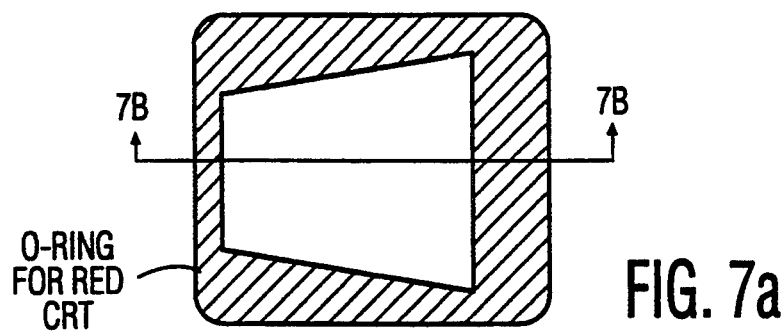
FIG. 7a shows a front view of an O-ring according to the invention for the red CRT.
Figure 7B:
Figure 8A:
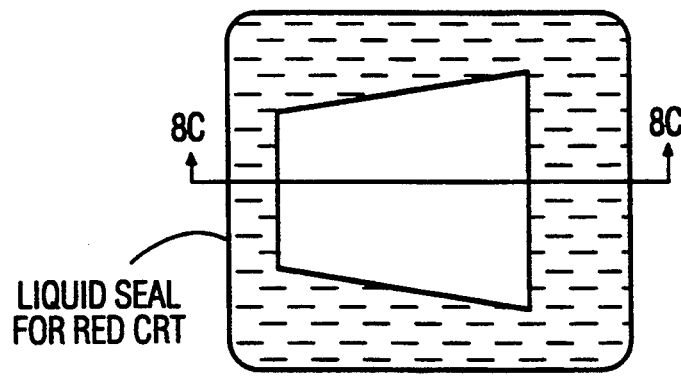
FIG. 8a shows a front view of a liquid seal and O-ring according to the invention for the red CRT.
Figure 8B:
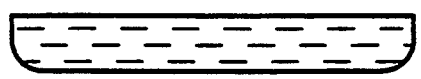
Figure 8C:
Figure 9:
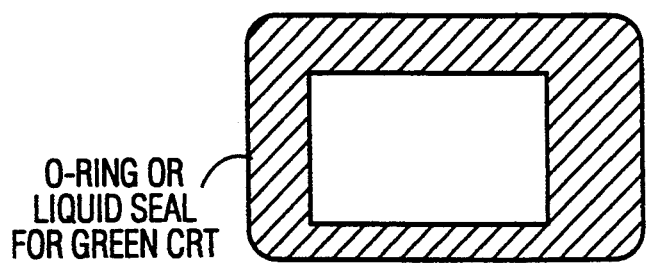
FIG. 9 shows an O-ring/liquid seal for the green CRT.

Given the dimensions, of FIG. 3, the dimensions of FIGS. 4–6 apply on the front surfaces of CRT's having 7" diagonals.

FIG. 4 shows the front surface of the red CRT on a grid marked in inches. The boundary of the region to be scanned is shown at 401. The boundary of the usable portion of the front surface of the CRT is shown at 402. The outside of the front surface of the CRT is shown at 403. The darkening of the front surface should fill a region between outside 403 and a boundary spaced out by approximately 0.1 inches from the boundary 401.

FIG. 5 shows the front surface of the green CRT on a grid marked in inches. The boundary of the area to be scanned is shown at 501. The boundary of the usable area of the front surface is shown at 502. The outside of the front surface of the CRT is shown at 503. The darkening of the front surface should fill a region between outside 503 and a boundary spaced out by approximately 0.1 inches from the boundary 501.

FIG. 6 shows the front surface of the blue CRT on a grid marked in inches. The boundary of the area to be scanned is shown at 601. The boundary of the usable area of the front surface is shown at 602. The outside of the front surface of the CRT is shown at 603. The darkening of the front surface should fill a region between outside 603 and a boundary spaced out by approximately 0.1 inches from the boundary 601.

The sides of boundaries 401, 501, and 601 are slightly bowed to compensate for barrel distortion in the lens assemblies sealed to the CRT's. The 0.1" border between the boundaries 401, 501, and 601 and the start of the darkening is to allow for manufacturing tolerances.

Those of ordinary skill in the art might devise any number of alternative methods for preventing light from escaping from the region between the boundary of the area to be raster scanned and the outside of the front surface of the tube.

I claim:

1. In a projection television system comprising first, second and third CRTs for projecting, into coincidence, different-colored images to form a composite color image in space and having a projection screen spaced from said CRTs for receiving and displaying the composite color image, said first CRT having its projection axis located with respect to the axis of said projection screen so as to project a substantially rectilinear image, said second and third CRTs having respective projection axes skewed with respect to the projection screen and providing non-rectilinear distorted images so as to compensate for their skewed position such that their projected images on the projection screen will be rectilinear and coincident with the rectilinear image projected by the first CRT, each of the CRTs having a bounded front surface on which their respective image is formed and each of the CRTs forming an actual image on its respective front surface that is smaller than and lies within the respective boundary of the respective front surface, and each CRT having a respective desired image shape, the improvement comprising:

means for preventing light generated by the formed actual images from being scattered from the front surface edges between respective boundaries of the respective desired image shapes and the respective boundaries of the respective front surfaces and causing unwanted glare, said means for preventing covering said front surface edges for blocking the scattered light from reaching the projection screen, said means for preventing on the first CRT being generally rectilinear to match the generally rectilinear image formed on the front surface of the first CRT, said means for preventing on the second and third CRTs being generally non-rectilinear to match the generally non-rectilinear images formed on the respective front surfaces of the second and third CRTs.

2. The improvement of claim 1 wherein the means for preventing comprises paint on a face of the front surface inside the first, second, or third CRT.

3. The improvement of claim 1 wherein the means for preventing is on a face of the front surface outside the first, second, or third CRT.

4. The improvement of claim 3 wherein the means for preventing comprises a masking substance applied to the outside of the first, second, or third CRT.

5. The improvement of claim 4 wherein the masking substance is a rubber skirt.

6. The improvement of claim 4 wherein the masking substance is a skirted or flanged o-ring sealing the CRT to a lens assembly.

7. The improvement of claim 1 wherein the sides of desired image shape of the substantially rectilinear image are slightly bowed to compensate for a barrel distortion in a lens accompanying the first CRT.

8. The improvement of claim 1 wherein the desired shape of the non-rectilinear image approximately defines a trapezoid.

9. The improvement of claim 8 wherein the sides of the trapezoid are slightly bowed to compensate for a barrel distortion in a lens accompanying the second or third CRT.

10. A projection television, comprising the improvement of claim 1, wherein the first CRT produces green light, the second CRT produces red light, and the third CRT produces blue light.

11. A projection television, comprising the improvement of claim 1, and further comprising
   a mirror disposed at a first angle; and
   the screen; and
   wherein the first, second, and third CRT's are arranged so that their light reflects off of the mirror onto the screen.

12. A projection television comprising the improvement of claim 1 wherein
   the first CRT is disposed between the second and third CRT's,
   the axes of the second and third CRT's point toward the axis of the first CRT,
   the respective desired image shape on the first CRT approximately defines a rectangle,
   the respective desired image shapes on the second and third CRT's approximately define first and second trapezoids, respectively.

13. The projection television of claim 12 wherein the sides of the respective desired image shapes are bowed to compensate for barrel distortion in lenses associated with the CRTs.

* * * * *